Patented Jan. 30, 1923.

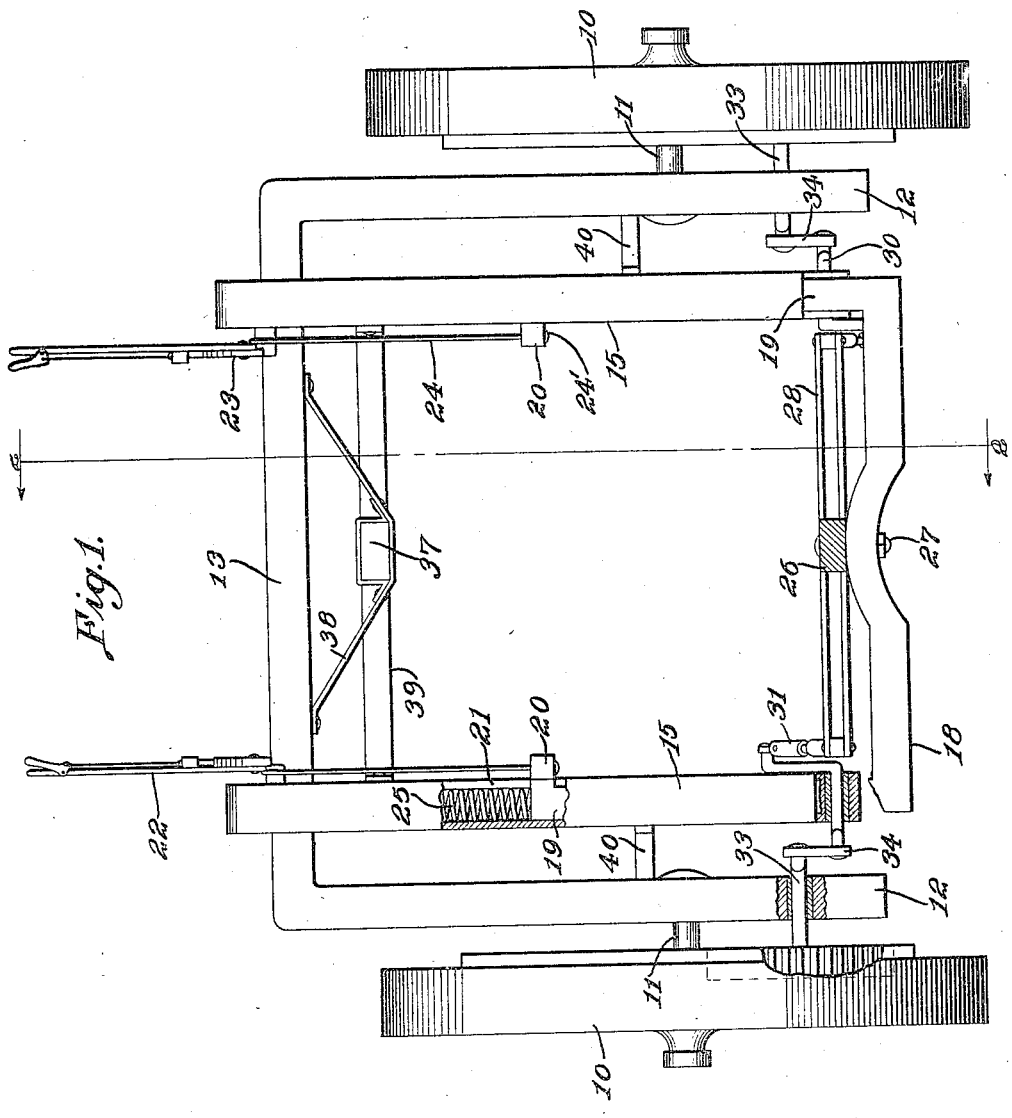

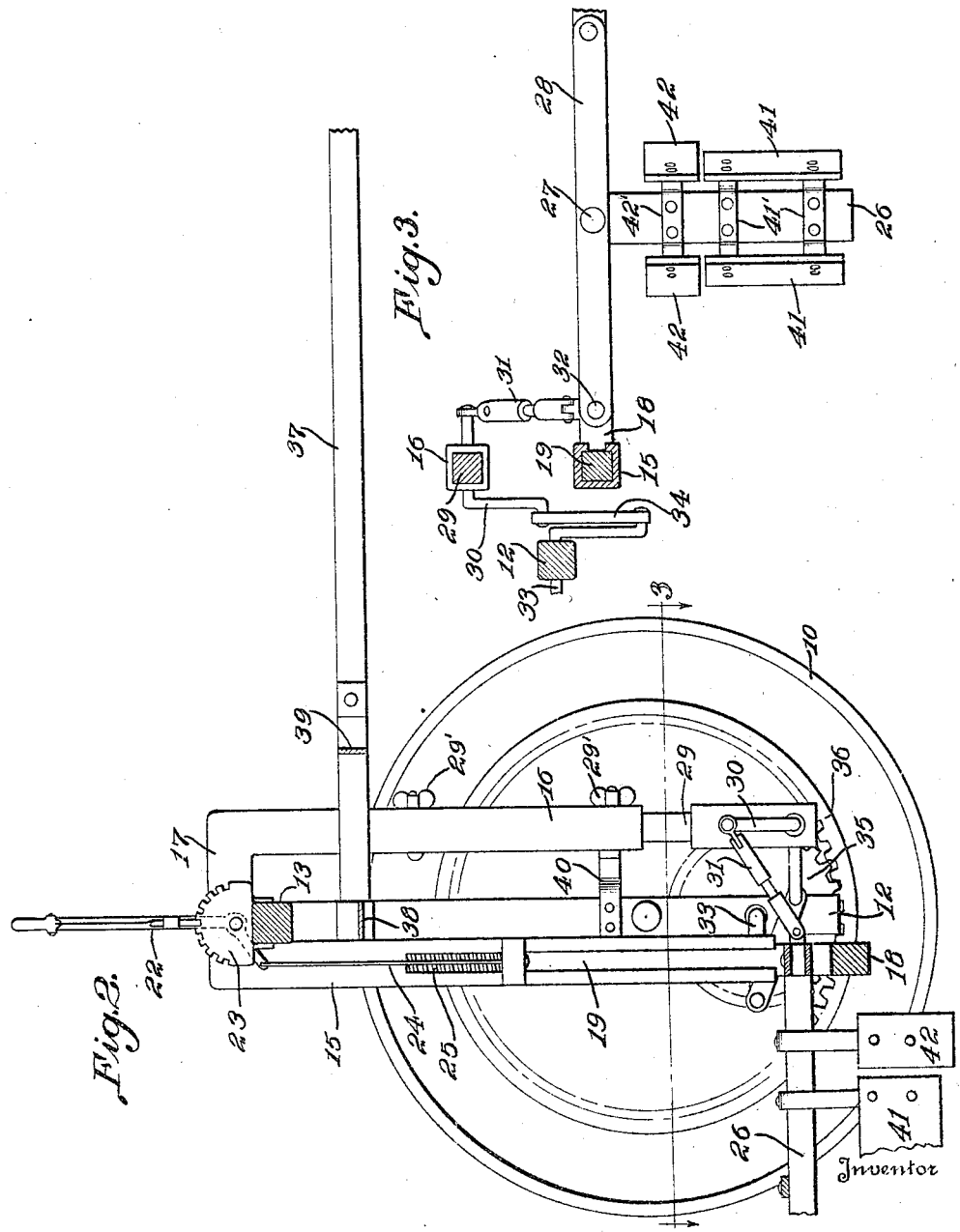

1,443,562

UNITED STATES PATENT OFFICE.

JAMES COLTHARP, OF BLUE MOUNTAIN, MISSISSIPPI.

COTTON CHOPPER.

Application filed June 24, 1922. Serial No. 570,601.

*To all whom it may concern:*

Be it known that I, JAMES COLTHARP, a citizen of the United States, residing at Blue Mountain, in the county of Tippah and State of Mississippi, have invented certain new and useful Improvements in Cotton Choppers; and I do hereby declare the following to be a full, clear, and exact description of the invention, such as will enable others skilled in the art to which it appertains to make and use the same.

This invention relates to agricultural implements, and more particularly to that type of implement known as a cotton chopper wherein the chopper or hoe instrument is movable transversely in the arc of a circle, means being provided for adjusting the chopper toward and away from the ground.

The various features of novelty and invention will appear from the detailed description thereof taken in connection with the accompanying two sheets of drawings forming part of this specification.

In the drawings,

Figure 1 is a rear elevation of the device, parts being broken away;

Fig. 2 is a vertical section on line 2—2 of Fig. 1, and

Fig. 3 is a horizontal section on line 3—3 of Fig. 2.

In the drawings, 10 indicates the wheels of the implement, 11 the axles thereof which are secured in leg members 12 projecting downwardly from a cross piece 13. Depending from the cross piece 13 are a pair of supports 15 and a second pair of supports 16, these supports being on opposite sides of the cross bar 13 and being connected by a cross member 17 which rests on said cross piece.

The numeral 18 indicates the bottom member or cross piece of a U-shaped frame having legs 19 which extend upwardly into the supports 15, said supports preferably being in the form of a tube. Projecting laterally from the tops of the legs 19 are lugs 20 which project through a slot 21 in said supports 15. Mounted on the cross piece 13 is a pair of bell cranks 22 and cooperating quadrants 23, there being a link connection 24 between said bell cranks and the lugs 20. The links 24 are headed as at 24' and are slidable downwardly through said lugs. Enclosed within the supports 15 are expansion coil springs 25 which re-act against the top of the legs 19. It will now be understood that the U-shaped frame 18, 19 may be bodily adjusted by means of the bell crank levers 22, such adjustment being made against the tension of the spring 25.

Mounted on the cross piece 18 is a hoe beam 26, 27 indicating the pivotal connection between said members. This hoe beam is preferably of T shape in plan, members 28 constituting the head of said T. The purpose of this head will be presently explained.

Adjustably mounted within the support 16 is a post 29, 29' indicating any suitable means for securing said post in adjusted position within said support 16. The lower end of this post 29 supports a crank shaft 30, one crank of said shaft being connected by an adjustable pitman 31 with one end of the head 28 of the hoe beam, the pivotal connection between said head and pitman being indicated at 32.

The legs 12 of the wheel frame are extended below the wheel axles 11 and support a crank shaft 33, the crank of which is connected by link 34 with the second crank of the crank shaft 30. The other end of the shaft 33 carries a pinion 35 which meshes with an internal gear 36 carried by the wheels 10.

The numeral 37 indicates a tongue which is suitably connected to the wheel frame as by a saddle bracket 38 secured to the cross piece 13, there being also a suitable brace 39 extending between said tongue and supports 16. Extending between the legs 13 and the depending supports 15 and 16 is a brace 40.

Mounted on the hoe beam 26 is a hoe or chopper member 41, the same being mounted on the hoe beam as by straps 41'. Also mounted on the hoe beam is another chopper 42 likewise suspended from the beam by a strap 42'. The chopper 42 as shown, preferably projects below the cutting edge of the hoe member 41.

The operation of the implement will now be briefly described: As the implement is drawn along by draft animals hitched to the tongue 37, the shaft 33 is caused to rotate by the wheels 10 through the gears 35 and 36. Rotation of the shaft 33 imparts rotation to the shaft 30 through the link 34 and shaft 30 imparts an oscillatory motion to the head 28 of the hoe beam by reason of the link connection 31. This oscillatory motion of the head 28 causes a lateral swinging movement of the hoe beam. The hoes or choppers are, therefore, moved from side to side to cut the cotton as will now be readily understood.

In order to vary the cutting depth of the choppers the latter may be adjusted by means of the bell crank or elbow levers 22, this adjustment being made against the tension of the springs 25. If the chopper should meet some unyielding obstruction, the U-shaped frame 18, 19 would rise against the action of the spring 25, it being remembered that there is a sliding connection between lugs 20 and the links 24, which are connected to the elbow levers 22.

In order to compensate for the adjustment of the frame 18, 19 relatively to the legs 12 of the main frame, the links 31 are of the adjustable type, preferably of the cushion type. If so desired, the link 34 which connects the shafts 30 and 33 may also be of similar type.

In order to give wide range of adjustment of the mechanism, the post 29 in which the crank shaft 30 is mounted is also made adjustable. After adjustment of the post 29 has been made, the securing means hold said post in fixed position and consequently, the connecting link 34 may be of fixed length in contradistinction to the link 31 which as already indicated, is preferably of the cushion type due to the fact that the frame which carries the hoe beam 26 is subject to automatic adjustment as well as manual adjustment.

While I have shown the hoe beam as carrying hoes, I desire it to be understood that the invention is not limited to that particular type of instrument. Any suitable agricultural tool may be attached to the hoe beam.

What I desire to secure by Letters Patent is:

1. In combination, a pair of wheels, a wheel frame to which said wheels are journaled, posts depending from said frame, a U-shaped frame slidably supported by said posts, a laterally swingable hoe beam supported by the cross piece of said U-shaped frame, and means for swinging said beam.

2. In combination, a pair of wheels, a wheel frame to which said wheels are journaled, posts depending from said frame, a U-shaped frame slidably supported by said posts, a laterally swingable hoe beam supported by the cross piece of said U-shaped frame, a crank shaft, means supporting said crank shaft, means for driving said shaft from one of the wheels, and connections between the hoe beam and crank shaft.

3. In combination, a pair of wheels, a wheel frame to which said wheels are journaled, posts depending from said frame, a U-shaped frame slidably supported by said posts, a laterally swingable T-shaped hoe beam supported by the cross piece of said U-shaped frame, and means connected to the ends of the head of the T for swinging said beam.

4. In combination, a pair of wheels, a wheel frame to which said wheels are journaled, posts depending from said frame, a U-shaped frame slidably supported by said posts, a T-shaped hoe beam supported by said U-shaped frame, a crank shaft adjustably supported relatively to said wheel frame, means coupling said shaft to one of said wheels for rotating said shaft and a connecting rod between said shaft and T-shaped beam.

5. In combination, a pair of wheels, an inverted U-shaped frame to the legs of which said wheels are connected, supports depending from the cross piece of said frame, a hoe beam, a frame on which said hoe beam is pivotally mounted, means for adjustably securing said hoe beam frame to said supports, means permitting automatic adjustment of said hoe beam frame, and means permitting manual adjustment of said hoe beam frame.

6. In combination, a pair of wheels, an inverted U-shaped frame to the legs of which said wheels are journaled, a hoe beam, a support on which said hoe beam is mounted for laterally swinging movement, means depending from said U-shaped frame for supporting said hoe beam support, a pair of independent supports at the lower ends of which is mounted a crank shaft, driving connection between said crank shaft and said hoe beam, and driving connection between said crank shaft and said wheels.

In testimony whereof I affix my signature.

JAMES COLTHARP.